United States Patent [19]

Sinden et al.

[11] Patent Number: 5,333,209
[45] Date of Patent: Jul. 26, 1994

[54] METHOD OF RECOGNIZING HANDWRITTEN SYMBOLS

[75] Inventors: Frank W. Sinden, Princeton; Gordon T. Wilfong, Gillette, both of N.J.

[73] Assignee: AT&T Bell Laboratories, Murray Hill, N.J.

[21] Appl. No.: 857,198

[22] Filed: Mar. 24, 1992

[51] Int. Cl.$^5$ .............................................. G06K 9/22
[52] U.S. Cl. ..................................... 382/13; 382/59
[58] Field of Search ................................ 382/13, 3, 59

[56] References Cited

U.S. PATENT DOCUMENTS

| | | | |
|---|---|---|---|
| 4,672,677 | 6/1987 | Yamakawa | 382/13 |
| 5,022,086 | 6/1991 | Crane et al. | 382/2 |
| 5,023,918 | 6/1991 | Lipscomb | 382/24 |
| 5,038,382 | 8/1991 | Lipscomb | 382/13 |

OTHER PUBLICATIONS

Tappert, "Cursive Script Recognition by Elastic Matching" *IBM J. Res. Develop*, vol. 26, No. 6 Nov. 1982 pp. 765–771.
K. Odaka and H. Arakawa, "On-Line Recognition of Handwritten Characters by Approximating Each Stroke with Several Points," IEEE Transactions on Systems, Man, and Cybernetics, vol. SMC-12, No. 6, Nov./Dec. 1982.
C. C. Tappert, C. Y. Suen, and T. Wakahara, "The State of the Art in On-Line Handwriting Recognition," IEEE Transactions on Pattern Analysis and Machine Intelligence, vol. 12, No. 8, Aug. 1990.
K. Zikan, "Least-Squares Image Registration," ORSA Journal on Computing, vol. 3, No. 2, Spring 1991.

*Primary Examiner*—Leo H. Boudreau
*Attorney, Agent, or Firm*—Geoffrey D. Green

[57] ABSTRACT

An unknown handwritten symbol written on a digitizing tablet is compared with symbols in a predefined "alphabet" or library of model symbols and the closest match chosen. Recognition is independent of the size, position or orientation of the symbols. The alphabet can be any collection of symbols, such as alphanumeric characters, ideograms or words in cursive script and is created by writing at least one example of each symbol on the tablet. A sequence of samples of the pen position is recorded while a symbol is being written. The samples form a vector, which is then translated so that the centroid of the symbol lies at an origin. The comparison, which can easily be done in real time, involves calculating a correlation factor from scalar products of the vector for the unknown symbol and two versions of the vector for each model symbol and choosing the model symbol having the highest correlation factor. If needed to distinguish between model symbols with similar correlation factors, the comparison can also include calculating a rotation factor from such vectors for use in making such choice. Embodiments of the invention can be configured that are user-independent, user-dependent or that evolve from one to the other.

36 Claims, 4 Drawing Sheets

METHOD OF RECOGNIZING HANDWRITTEN SYMBOLS

TECHNICAL FIELD

This invention relates to symbol recognition and more particularly to recognition of symbols handwritten on a digitizing tablet.

BACKGROUND OF THE INVENTION

With the advent of faster computers and apparatus such as digitizing tablets or pads for entry of hand-written information and/or symbols into computers, it is becoming more desirable to devise ways to recognize characters or symbols for further processing and for such recognition to proceed on line in real time. A number of prior-art methods of recognizing handwritten symbols have relied on recognizing features in the symbols, for example, ascenders, descenders, closure of letters, dotting of i's and crossing of t's. Many prior-art methods are described in the article by Tappert et al. entitled "The State of the Art in On-Line Handwriting Recognition" published in IEEE Transactions on Pattern Analysis and Machine Intelligence, Vol. 12, No. 8 (August 1990). Other methods have made use of neural nets, for example, as shown in U.S. Pat. No. 5,052,043 to Gaborski. Still other methods analyze strokes, as shown in U.S. Pat. Nos. 5,023,918 and 5,038,382 to Lipscomb and the article by Odaka et al. entitled "On-Line Recognition of Handwritten Characters by Approximating Each Stroke with Several Points" published in IEEE Transactions on Systems, Man, and Cybernetics, Vol. SMC-12, No. 6 (November/December 1982).

Another common method used is curve matching, where an attempt is made to match each written symbol with a library of stored curves to find the best fit. Curve matching is described in the Tappert article referred to above. Curve matching techniques generally use a normalization routine to minimize differences in translation, orientation and scale of symbols to be recognized. Sometimes the user is forced to conform to writing at specific locations on a digitizing tablet and/or writing with a specific orientation. Obviously it is desirable to place as few constraints on the user as possible.

There is a need to be able to recognize many kinds of symbols, including such symbols as alphanumeric characters, cursive script, Chinese or Kanji characters, electrical, chemical and architectural symbols, and so on. In some applications it is desirable to know who entered a symbol, for example, in the verification of signatures. Sometimes the pattern of forces resulting when a signature is written is made use of in identifying a signature, for example, as shown in U.S. Pat. No. 5,022,086 to Crane et al. In other applications it is desirable to have a user-independent system where a number of users enter their own versions of the same symbol and still have the symbol identified correctly.

Different forms of apparatus are presently available for entering handwritten information directly into a computer in real time, such as digitizing tablets and light pens. Optical character readers can be used for previously written information, but as will be seen, useful information can be lost when the actual sequence of writing is not captured

SUMMARY OF THE INVENTION

An unknown handwritten symbol written on a digitizing tablet is compared with symbols in a predefined "alphabet" or library of model symbols and the closest match chosen. Recognition is independent of the size, position or orientation of the symbols. The alphabet can be any collection of symbols, such as alphanumeric, Chinese or Kanji characters or words in cursive script and is created by writing at least one example of each symbol on the tablet. A sequence of samples of the pen position is recorded whiled a symbol is being written. The samples form a vector, which is then translated so that the centroid of the symbol lies at an origin. The comparison, which can easily be done in real time, involves calculating a correlation factor from scalar products of the vector for the unknown symbol and two versions of the vector for each model symbol and choosing the model symbol having the highest correlation factor. If needed to distinguish between model symbols with similar correlation factors, the comparison can also include calculating a rotation factor from such vectors for use in making such choice. Embodiments of the invention can be configured that are either user-independent, user-dependent, or that evolve from one such form to the other.

DETAILED DESCRIPTION

Figure 1:
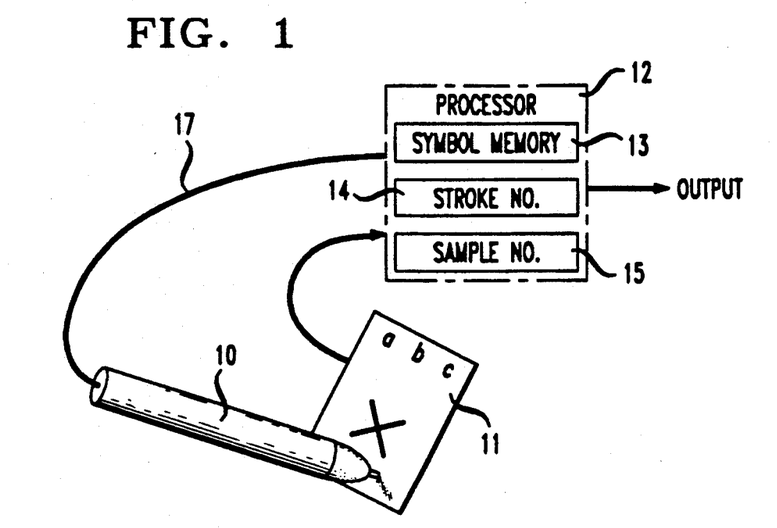
FIG. 1 is a block diagram of a system for performing the invention.

FIG. 1 is a block diagram of a system for performing the invention. Symbols are written with stylus or pen 10 on digitizing tablet or pad 11. Pad 11 is capable of sensing the position of the tip of pen 10 on the surface of pad 11 as well as the presence of pen 10 on the pad.

Pad 11 is connected to processor 12. With some types of pads, pen 10 may also be connected to processor 12 as indicated by line 17. Symbol memory 13 is used to store representations of model symbols. Registers 14 and 15 are used for storing, respectively, the number of strokes in each symbol and the number of samples taken for each stroke. Typically, memory 13 and registers 14 and 15 would be part of the random-access memory of processor 12. An example of a processor suitable for performing the invention is a Sun SPARCstation TM.

In operation, as a symbol is written on pad 11, processor 12 collects a time sequence of samples of the position of the tip of pen 10 on the surface of pad 11. Each sample is a set of x-y coordinates of the position of the tip of pen 10. Typically, such samples are taken at a rate of about 250 samples per second and the x-y coordinates and the position of pen 10 can be sensed with a resolution of about 0.1 mm. A typical handwritten alphanumeric character will have from 100-250 samples.

Symbols can be written any size, at any orientation, and at any location on pad 11. Symbols can be letters, words, Chinese or Kanji characters, cursive script, engineering or chemical symbols: in short, anything that can be written. The only limitations are the size of the pad and the amount of memory needed to record the samples taken.

Figure 2:
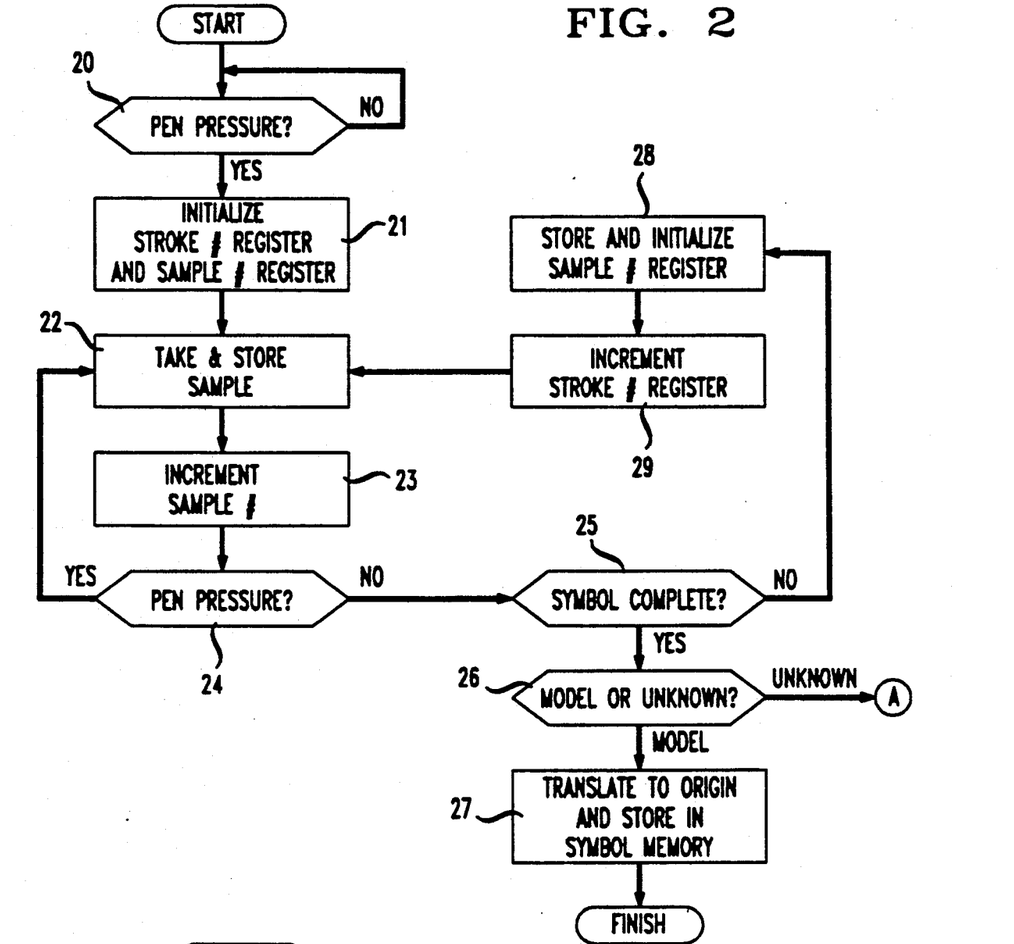
FIG. 2 is a flow chart showing how samples of a handwritten symbol are taken.

FIG. 2 is a flow chart showing how samples of a handwritten symbol are recorded by the system of FIG. 1. As will be clear to one skilled in the art, the activities shown in FIG. 2 (and FIG. 3) would typically be controlled by a computer program stored in memory in processor 12.

As indicated by blocks 20 and 21, processor 12 waits until pen 10 touches pad 11, then initializes stroke register 14 and sample register 15. As each stroke of the symbol is written, processor 12 takes samples at its sampling rate of the position of the tip of pen 10 on tablet 11, stores such samples in its memory and increments the sample counter, as indicated by blocks 22 and 23. Samples are taken until pen 10 is lifted from pad 11, as indicated by block 24.

When pen 10 is lifted from pad 11, a determination must be made whether the symbol is complete. This determination can be achieved, for example, by timing the interval between the time pen 10 is lifted and the time it again touches pad 11. If the interval is short, say less than 0.5 seconds, it can be assumed that an additional stroke will follow. If the interval is longer, then it can be assumed that the symbol is complete. Block 25 represents such decision. If an additional stroke will follow, then the number of samples taken for the stroke is stored and the sample register is re-initialized, as indicated by block 28, and the stroke register is incremented, as indicated by block 29, before the next sample is taken.

Both model symbols and unknown symbols are written into the system by means of pen 10 and pad 11. The system is essentially "trained" by writing in at least one model for each symbol that the system is expected to recognize and associating the samples recorded for that model symbol with a corresponding label. Thus, if it is desired for the system to be able to recognize alphanumeric characters, models for each character are so written and associated with the corresponding letter or number.

If the models are highly stylized or individualistic, then only the writer of the models may be able to write characters that can be correctly recognized. However, a number of different examples of each character can be entered as models to take into account the variation that is possible or the system can adapt itself, as will be described below.

Processor 12 can be either in the mode of accepting model symbols or in the mode of accepting unknown symbols. Referring again to FIG. 2, if the symbol being written is a model symbol, then as indicated by blocks 26 and 27, the samples for such symbol are stored in symbol memory 13 of processor 12. Before such samples are stored, however, they are translated so that the "center of gravity," or centroid, of the symbol is at an origin. As will be seen, this translation performed on the model symbols and the unknown symbols is an initial step in comparing an unknown symbol with the model symbols and positions the unknown and model symbols with respect to each other so that the location of the unknown symbol on pad 11 is irrelevant and so that rotations can be taken into account consistently. Such a translation is described elsewhere, for example, in the Tappert article referred to above. The method used to perform the translation will be described below in conjunction with the description of FIG. 4.

It is convenient to perform the translation on a model symbol before the samples for the model symbol are stored so that the translation does not have to be performed each time a comparison is made with the model symbol. However, such translation can be performed at the time of comparison, if desired. The samples are stored in the model memory along with the number of strokes and in such a way that the samples for each stroke can be identified. Also stored in association with the samples is an identification of the model symbol that the samples represent.

The samples for a symbol can be thought of in a mathematical sense as a vector. For example, the samples for a symbol before the translation described above can be expressed as a vector n:

$$n = (x_1, y_1, \ldots, x_n, y_n) \tag{1}$$

and after the translation as a vector v:

$$v = (\bar{x}_1, \bar{y}_1, \ldots, \bar{x}_n, \bar{y}_n) \tag{2}$$

Figure 4:
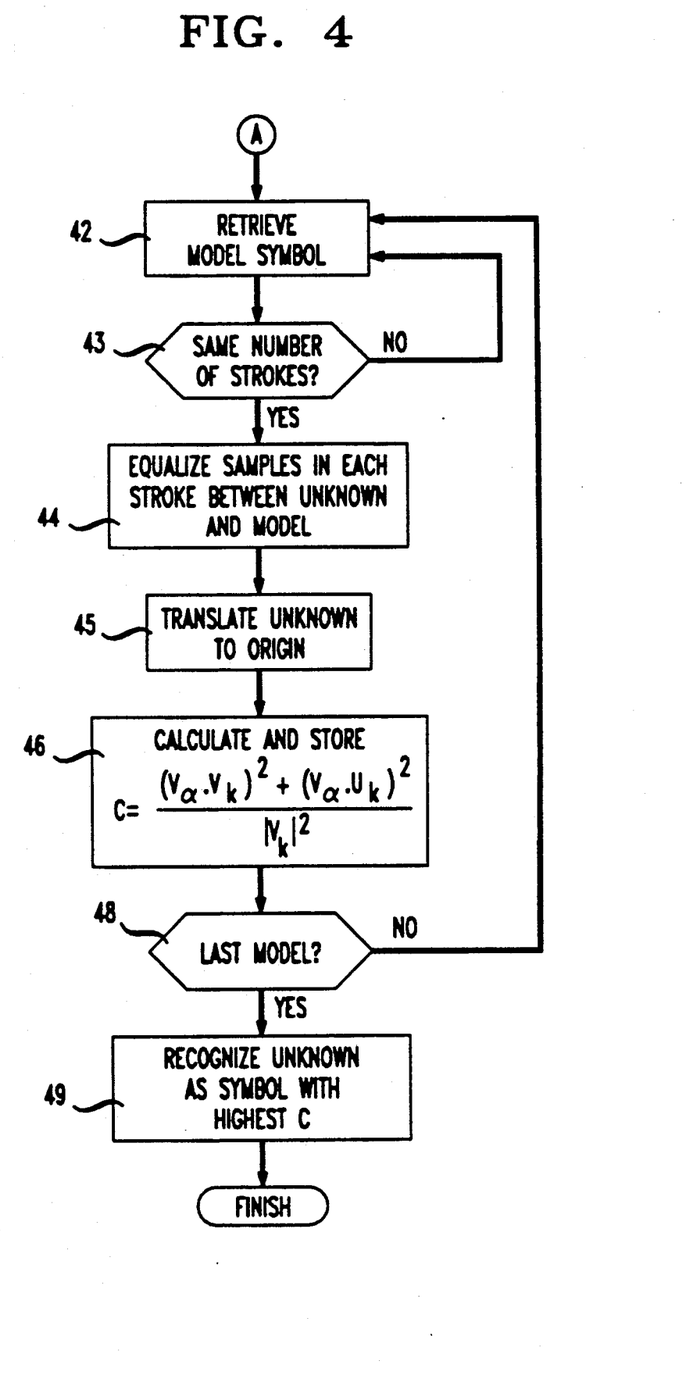
FIG. 4 is a flow chart showing the method of the invention for comparing samples for an unknown symbol and samples for model symbols to identify the unknown symbol.

If the symbol written is an unknown symbol, then as indicated at block 26 in FIG. 2, processor 12 proceeds with the steps shown in the flow chart of FIG. 4.

Figure 3:
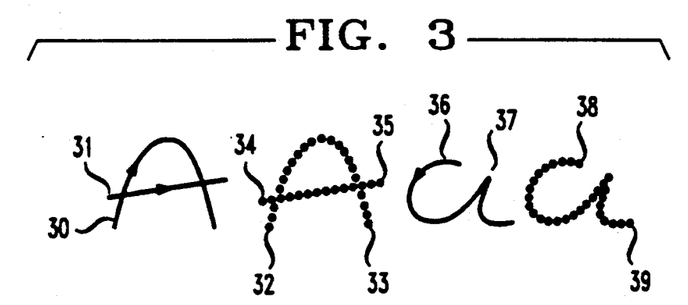
FIG. 3 is a diagram showing handwritten symbols and dots representing samples taken for such symbols.

FIG. 3 is a diagram showing typical handwritten symbols and the series of dots representing samples taken for such symbols. The block letter "A" shown on the left can be written with two strokes 30 and 31 with the strokes moving in the directions shown by the arrows. The dotted version of letter "A" shows samples taken as the letter is written with the speed of the pen tip relatively constant. The first and last samples of the first stroke are at 32 and 33; the first and last samples of the second stroke are at 34 and 35. The cursive letter "a" shown at the right would usually be written with one stroke 36 that reverses at point 37, but which would typically be written without lifting the pen from the pad. The first and last samples of stroke 36 are shown at 38 and 39.

As can be seen, the actual values of the samples being recorded as a symbol is being written depend on the speed at which the tip of the pen is moved and the sequence of the samples in the vector representing the symbol depends on the directions associated with the various strokes in the symbol. Thus, the samples for symbols that appear to be indentical can be quite different, depending on how the symbols were actually written. This difference can be enough that the method of the invention will not recognize the symbols as being identical. However, this property of the invention can be used to advantage as will be described below in connection with signature verification.

FIG. 4 is a flow chart showing how the samples for an unknown symbol and the model symbols are compared to identify the unknown symbol. After an unknown symbol is entered, the vector $v_k$ for a model symbol having the same number of strokes as the unknown is retrieved, as indicated by blocks 42 and 43.

Vector $v_a$ for the unknown and vector $v_k$ for the model must then be compared to determine how well they correlate. For the correlation to proceed, however, it is necessary that $v_a$ and $v_k$ contain the same number of samples, and, if the symbol contains more than one stroke, it is preferable that the number of samples in each stroke correspond. This is accomplished by equalizing the number of samples in $v_a$ and $v_k$, stroke by stroke.

Figure 5:
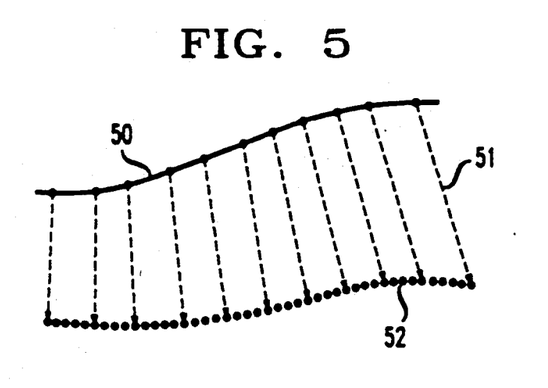
FIG. 5 is a diagram illustrating how the number of samples for each stroke in a symbol is equalized between an unknown symbol and a model symbol.

This equalization can be accomplished in a number of different ways. One way that has been found satisfactory is to use only every tenth sample in each stroke of $v_a$ and then use the same number of samples from each stroke of $v_k$. An example of such equalization is shown in FIG. 5, where a number of samples are shown along stroke 50. Dotted lines such as 51 lead to the same number of samples to be selected out of many more along stroke 52. The samples along stroke 50 represent every tenth sample in a stroke of $v_a$. This method assumes that the original $v_a$ will never have more than ten times the number of samples as the original $v_k$.

Another way of performing the equalization is to interpolate additional samples into $v_k$ so that such vector contains many more samples than $v_a$, then selecting only the number of samples from the augmented $v_k$ as are in $v_a$. The interpolation and selection should be evenly distributed along $v_k$.

After equalization, $v_a$ is then translated as indicated by block 45 so that the centroid of the unknown symbol lies at the origin, as was also done for the model symbols when they were stored (block 27 in FIG. 2). To perform this translation on a vector, the centroid z is found by $$z = \left( \frac{1}{n} \sum_{i=1}^{n} x_i, \frac{1}{n} \sum_{i=1}^{n} y_i \right) = (x_z, y_z) \quad (3)$$

and the translation is performed by evaluating $$\bar{x}_i = x_i - x_z \text{ and } \bar{y}_i = y_i - y_z \text{ for } 1 \leq i \leq n \quad (4)$$

Equation 4 gives the terms shown in equation 2 shown above.

As indicated by block 46, the correlation C between the unknown symbol and the model symbol with which it is being compared is calculated from $$C = \frac{(v_a \cdot v_k)^2 + (v_a \cdot u_k)^2}{|v_k|^2} \quad (5)$$

where $$u_k = (-\bar{y}_1, \bar{x}_1, \ldots, -\bar{y}_n, \bar{x}_n) \quad (6)$$

which is the vector derived from $v_k$ by a counterclockwise rotation through $\pi/2$ radians, and where $v_a \cdot v_k$ and $v_a \cdot v_k$ are scalar dot products of the respective vectors.

The correlation C represents the degree of closeness of vector $v_a$ for the unknown symbol to vector $v_k$ for the model symbol. The higher the value of C, the closer the vectors. Thus, as indicated by blocks 47, 48 and 49, the model symbol associated with the highest value of C is recognized as the unknown symbol.

A detailed discussion of the derivation of Equation 5 is given in the Appendix. However, a brief discussion of the theory underlying the derivation of Equation 5 will now be presented.

Vector $v_a$ representing the unknown symbol and vector $v_k$ representing the model symbol each contain n samples and 2n different quantities. Each such vector can be thought of as a point in 2n-dimensional space. Recall that $v_a$ and $v_k$ have been equalized so that both have the same number of samples and translated so that the centroids of their respective symbols lie at an origin. Such translated and equalized vectors for all possible rotations and sizes of a symbol will fall in a 2-dimensional plane passing through the origin of such 2n-dimensional space. Thus, all possible rotations and sizes of the unknown symbol will be represented by one such 2-dimensional plane and all possible rotations and sizes of the model symbol will be represented by another such 2-dimensional plane. Both planes meet only at the origin of such 2n-dimensional space, and an angle $\Theta$ can be defined between the planes. Angles are one-dimensional quantities that can easily be compared. The smaller the angle between such planes, the higher the correlation between the symbols they represent, regardless of where on the planes the points defining the actual sizes and rotations of the symbols happen to lie. The quantity C calculated in equation 5 is a function of the cosine of such angle $\Theta$. Since the cosine of an angle approaches 1 as the angle approaches zero, the highest C represents the closest correlation.

A few examples of actual values calculated for C can be given to illustrate the operation of the invention. Models of the 36 alphanumeric characters were entered as block capitals via a digitizing pad as described above. Twenty characters (e.g. L, W, 1, 6) were entered as 1-stroke characters; fourteen (e.g. A, X, 4, 5) as 2-stroke characters and two (H, I) as 3-stroke characters. The model and unknown characters were entered on a digitizing tablet without particular attention being paid to size, orientation or location on the tablet. The correlations that resulted are listed in Table I. As can be seen from Table I, for example, when the letter W was entered as an unknown, the model having the highest correlation was the letter "W", that having the next highest was the number "9" and that having the lowest was the letter "M".

Figure 6:
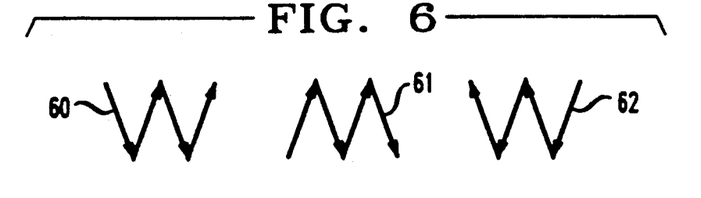
FIG. 6 is a diagram illustrating how symbols that are rotations of each other are distinguished.

Some characters are similar to rotations of others, for example, "M"–"W" and "6"–"9". Because of the usual time sequence of writing these characters, however, such rotations can be distinguished. This distinction is illustrated in FIG. 6. The letters "W" and "M" shown at 60 and 61 are typically written as single strokes moving in the directions of the arrows. Thus, the time sequence of samples for each of these letters follows the arrows. If the letter "M" at 61 is rotated to form the "W" at 62, however, the arrows point in the opposite direction. Thus, the samples for a "W" that is a rotated "M" will be in reverse order from a "W" that is written as such and the correlation calculated as described above will be low. As can be seen from Table I, when a "W" was entered into the system as an unknown, the correlation with the model for "M" turned out to be the lowest of all the other 1-stroke symbols.

There may be rotations, for example, "N"–"Z" and "E"–"W", where the shapes of the symbols are similar and the time sequences of samples are essentially the same. In such cases, the correlations for an unknown with respect to each of the models for the different rotations could be close and a choice based solely on the highest value of C might be unreliable. In order to distinguish such cases, it is useful to also compare the actual rotation between the unknown symbol and the model symbols. This can be accomplished by also evaluating $$R = \frac{v_a \cdot v_k}{\sqrt{(v_a \cdot v_k)^2 + (v_a \cdot u_k)^2}} \quad (7)$$

for the unknown symbol with respect to each model symbol. R represents the cosine of the angle of rotation between the unknown symbol and the model symbol with which it is being compared. Because the cosine of an angle approaches unity as the angle approaches zero, the closest model symbol will be associated with the value of R closest to unity.

Figure 7:
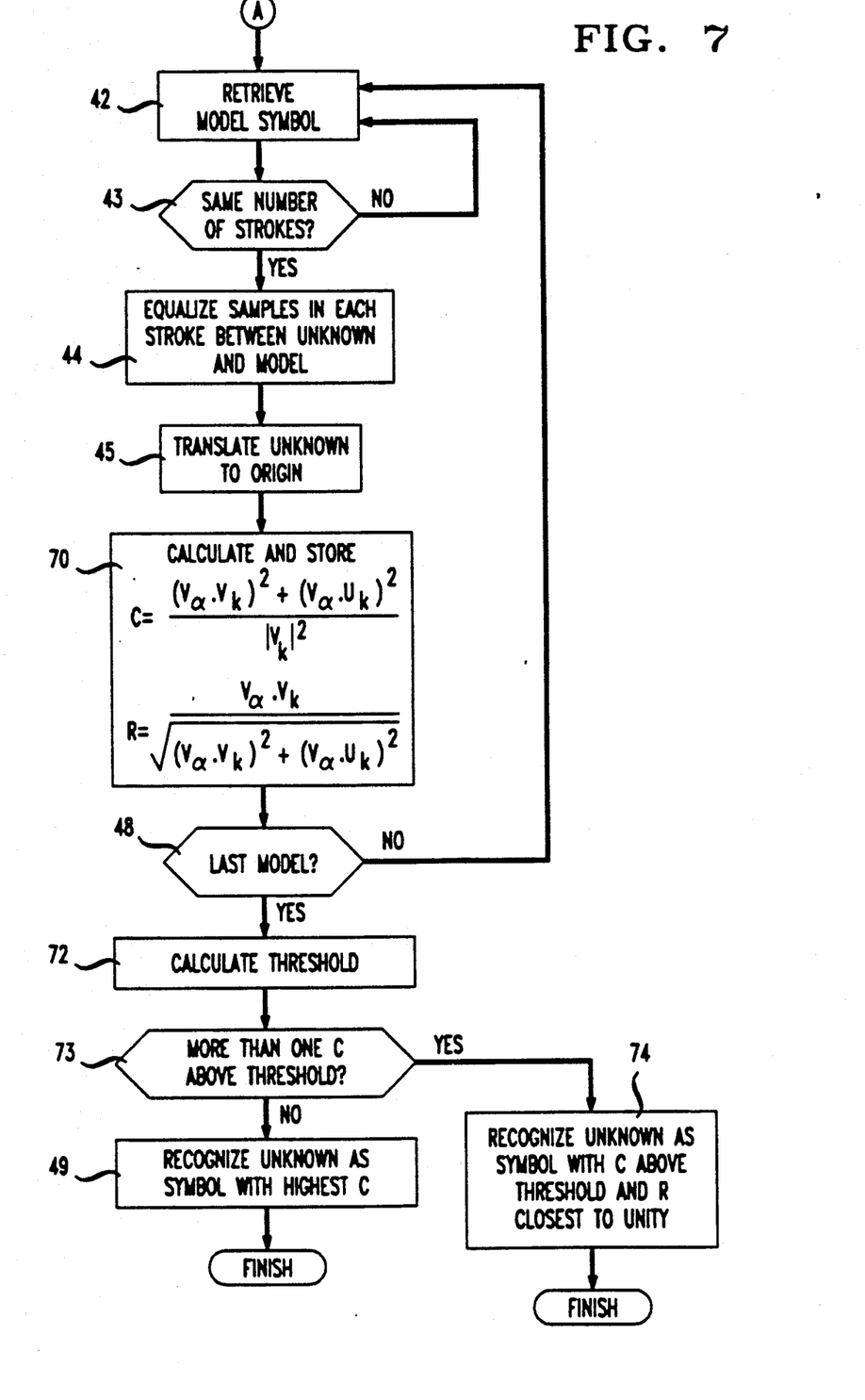
FIG. 7 is similar to the flow chart of FIG. 4 but showing additional steps for comparing rotation of an unknown symbol with model symbols.

FIG. 7 shows the flow chart of FIG. 4 modified to incorporate the calculation and use of R in choosing the closest model symbol to the unknown. Reference numerals for blocks that have identical functions are the same as in FIG. 4.

Referring to FIG. 7, block 70 indicates calculation and storage of both C and R for each model symbol being compared with the unknown symbol. After such calculations have been performed for all the models of interest, then a threshold is determined as indicated by block 72. Such threshold can be a percentage, say 90%, of the highest C. If the C associated with only one model symbol falls above the threshold, then the unknown symbol is recognized as such model symbol, as indicated by blocks 73 and 49. However, if more than one C falls above the threshold, then the unknown symbol is recognized as the model symbol having both C above the threshold and R closest to unity, as indicated by blocks 73 and 74.

As indicated by block 70, R is calculated at the same time as C for each model symbol being compared. However, it may be more convenient to wait until just before the recognition step indicated in block 74 and calculate R only for the smaller number of model symbols having values of C above the threshold.

Table II shows examples illustrating the resolution of rotations as just described. The symbols entered were single-stroke alphanumeric block characters, but with the model and unknown characters entered with essentially the same orientation. In Example 1, the letter "N" was entered as the unknown symbol, the model symbol "N" had both the highest C and the value of R closest to unity and the model "Z" also had C above the threshold. In Example 2, the letter "N" was again entered as the unknown but the model symbol "Z" had the highest C and the model "N" had C above the threshold and the value of R closest to unity. In both cases, the model symbol "N" was recognized as the unknown on the basis of its value of R.

Example 3 shows "Z" as the unknown and the model "N" having the highest C but with "Z" being recognized as the unknown on the basis of R closest to unity.

In the embodiment of the invention described above, an unknown symbol is compared with model symbols to find a match. More than one model can be stored for each symbol, if desired, to allow for variations in the way symbols are written by a particular user or even to create a user-independent system. For a user-independent system, the library of model symbols can include all likely variations and combinations of number of strokes, stroke order and stroke direction for each symbol. Such variations increase the probability of correct identification of unknown symbols written by anyone. Such a library can be pre-recorded and used advantageously in systems that are furnished to users "off the shelf".

Embodiments of the invention can be structured to acquire additional models if the originals are not sufficient, or to modify the models from experience. An example of a method of acquiring additional symbols is diagrammed in the flow chart of FIG. 8, which illustrates a training mode. In this mode, an unknown symbol is entered and the closest model symbol to the unknown is chosen using the method of the invention described above and the choice is displayed to the person training the system. As represented by block 80, the trainer then indicates whether or not the choice was correct, and, if incorrect, what the correct choice is. Then, as indicated by block 81, the system stores the sample vector for the unknown symbol entered as an additional model for the correct choice. Such a training mode can be continued until the performance of the system is satisfactory.

Another way of causing the system to adapt is to modify the vector for a model symbol every time an unknown is entered that is found to match the model. One approach is to simply replace the model with the unknown, under the assumption that the most recent instance of a symbol is the best one. Still another method would be to cause the model to "shift" slightly in the direction of each unknown that is found to match. However, such a shift would require calculating new values for the samples in the model vector, which would not necessarily be a trival task, given the differences that could exist in the number of samples and values of such samples between a matching unknown and the model.

A more preferable method of adaptation is to store a number of the most recent instances for each model and to discard the oldest instance each time a new one arrives. Thus, the set of models is always "up to date" and reflects any long-term changes that may be taking place in the symbols in the set.

For applications in which the invention will be used by an individual or a small number of users, an embodiment can be configured that adapts to the user or users and operates faster as its adapts. In such an embodiment, the system is initially configured to be user-independent by inclusion of all likely variations of symbols in the model library, as described above. Then, instances of symbols input by users are added to the library and, after a suitable number of such user instances are added, the original models are discarded. The number of user instances kept for each symbol can be quite small, possibly as small as one model per symbol. Thus, because the number of models for each symbol is reduced, which reduces the calculation time needed to determine the closest model, and the symbols are specific to the user or users, the system will evolve from a user-independent system to a user-independent system that is faster and more accurate.

Figure 8:
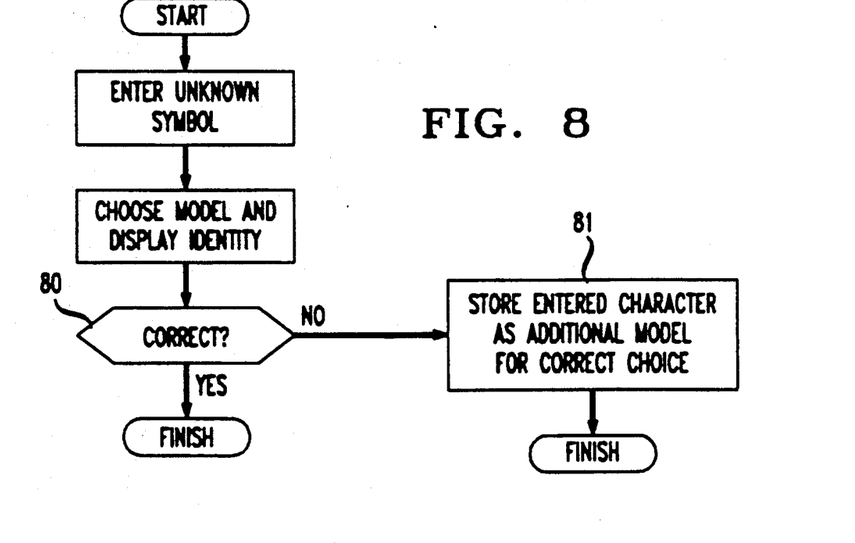
FIG. 8 is a flow chart showing one method that can be used by the system of the invention system to strengthen its ability to recognize different versions of the same symbol.

Conversely, for a user-independent system that is expected to be used by a large number of users, an embodiment can be configured that adapts by adding models, for example, as explained in the description of FIG. 8 above. However, because increasing the number of models will tend to increase the calculation time needed to determine the closest model, such a system will tend to be slower than a user-dependent system.

As can be seen from the above description, the method of the invention is very dependent on the direction and sequence in which the various strokes of a symbol are written. In a practical system for symbol recognition, if a symbol can be written in more than one way, then at least one model will probably have to be included for each possibility. However, this property of the invention can be exploited for such applications as signature verification.

The system of the invention can be used for signature verification by entering prospective signatures as model symbols. Then when a signature is entered for verification, it is compared with the models to find a match. If the right model is chosen, then the signature is considered verified. Even if a forger could write a passable copy of a signature, it is much less likely that the forger would be able to duplicate the stroke sequence and writing dynamics of the owner of the signature such that a good match obtained. In this kind of application, when the highest correlation C is found, it may be desirable to also compare the highest C with the next-highest to establish a measure of confidence that the correct signature has been found. For example, if the next-highest C is more than a certain percentage, say 80%, of the highest, then the presented signature could be rejected as not being reliably matched. An alternative would be to compare the highest C with a threshold value and reject any presented signature for which C does reach the threshold for any model signature.

It is understood that other embodiments are possible that incorporate the principles of the invention and that the above disclosure is merely illustrative of such principles and is not intended to be limiting in any respect.

APPENDIX

In Equation 5, C is a measure of the similarity or closeness between an unknown symbol and a model symbol or, more precisely, the similarity or closeness between the vector $v_\alpha$ representing the unknown symbol and the vector $v_k$ representing the model symbol. Each vector is assumed to include n samples each comprising an x coordinate and a y coordinate. Thus, there are 2n quantities, or dimensions, in each vector. As explained in the specification, the number of samples for the unknown symbol and the model symbol with which it is being compared are equalized to be the same. Because each vector has 2n dimensions, it represents a single point in 2n-dimensional space (2n-space).

We need to be able to compare an unknown symbol with the model symbols regardless of the orientation or size of the unknown with respect to the models. This can be done by comparing the set $S_\alpha$ of all sizes and orientations of an unknown symbol with the set $S_k$ of all sizes and orientations of each model symbol. The vectors for such a set all fall on the same two-dimensional plane in 2n-space. Such planes meet at the origin of 2n-space. The "distance" between such planes can be defined as the angle between them and the similarity or closeness of two symbols is related to the angles between their representative planes. The object, then, is to calculate such angle.

To define the set S of all sizes and orientations of a symbol, we first need to define a vector w as follows:

$$w(\gamma, r) = r(v \cos \gamma + u \sin \gamma) \quad (8)$$

$$\text{where } v = (\bar{x}_1, \bar{y}_1, \ldots, \bar{x}_n \bar{y}_n) \quad (9)$$

$$\text{and } u = (-\bar{y}_1, \bar{x}_1, \ldots, -\bar{y}_n \bar{x}_n) \quad (10)$$

where u represents a counterclockwise rotation of v through $\pi/2$ radians. From Equation 7, is can be seen that vector w is derived from vector v by an r-fold enlargement or dilatation and a counterclockwise rotation through $\gamma$ radians. The sets of all sizes and orientations of a symbol represented by vector v is then:

$$S = \{w(\gamma, r): 0 \leq r < \infty \text{ and } -\pi \leq \gamma \leq \pi\} \quad (11)$$

The angle between two vectors $z_1$ and $z_2$ in 2n-space can be derived from the definition of the scalar product of such vectors:

$$z_1 \cdot z_2 = |z_1||z_2| \cos \Theta \quad (12)$$

Solving for $\Theta$ yields:

$$\Theta = \cos^{-1}\left(\frac{z_1 \cdot z_2}{|z_1||z_2|}\right) \quad (13)$$

For any two vectors, Equation 13 yields an angle between 0 and $\pi$ radians.

The angle between planes $S_\alpha$ and $S_k$ is defined to be the smallest angle between any pair of vectors $w_\alpha(\gamma_\alpha, r_\alpha)$, $w_k(\gamma_k, r_k)$ in $S_\alpha$ and $S_k$ respectively. Thus:

$$\Theta(S_\alpha, S_k) = \min\left[\min^{-1}\left(\frac{w_\alpha(\gamma_\alpha, r_\alpha) \cdot w_k(\gamma_k, r_k)}{|w_\alpha(\gamma_\alpha, r_\alpha)||w_k(\gamma_k, r_k)|}\right)\right] \quad (14)$$

Using Equations 8 and 10, Equation 14 can be rewritten in terms of the given vectors $v_\alpha$ and $v_k$. However, to aid in simplifying the result, note the following relationships:

$$v_\alpha \cdot u_\alpha = v_k \cdot u_k = 0 \quad (15)$$

$$v_\alpha \cdot v_k = u_\alpha \cdot u_k = p_k \quad (16)$$

$$v_\alpha \cdot u_k = u_\alpha \cdot u_k = q_k \quad (17)$$

Equations 16 and 17 define new symbols $p_k$ and $q_k$. Without loss of generality, vectors $v_\alpha$, $v_k$, $u_\alpha$ and $u_k$ can be normalized to 1 so that:

$$|v_\alpha| = |u_\alpha| = |v_k| = |u_k| = 1 \quad (18)$$

Substituting into Equation 14 the expressions for $w_\alpha$ and $w_k$ given by Equation 8 and simplifying by use of Equations 15–18 gives:

$$\Theta(S_\alpha, S_k) = \min[\cos^{-1}(p_k \cos \gamma + q_k \sin \gamma)] \quad (19)$$

where $\gamma = \gamma_k - \gamma_\alpha$ and the minimum is now taken over the single parameter $\gamma$. Note that the dilatation factors $r_\alpha$, $r_k$ have disappeared because of the normalization. Since the arc cosine is a decreasing function over the range 0, $\pi$, Equation 19 can be rewritten as:

$$\Theta(S_\alpha, S_k) = \cos^{-1}\left(\max_\gamma [p_k \cos \gamma + q_k \sin \gamma]\right) \quad (20)$$

Finding the maximum by calculus gives:

$$\Theta(S_\alpha, S_k) = \cos^{-1}((p_k^2 + q_k^2)^{\frac{1}{2}}) \quad (21)$$

In practice, since what is wanted is the identity of the model symbol associated with the smallest angle $\Theta$, the actual angle itself need not be calculated; the needed comparisons can be carried out by comparing the values of the expression:

$$K_n = p_k^2 + q_k^2 \quad (22)$$

associated with the symbols being compared. Equation 22 can be rewritten in terms of vectors $v_a$, $v_k$, $u_a$, and $u_k$ by using Equations 15-17 as;

$$K_n = (v_a \cdot v_k)^2 + (v_a \cdot u_k)^2 \quad (23)$$

In order to simplify the above derivation, a normalization step was performed as shown by Equation 18. Without such normalization, Equation 23 would become:

$$K = \frac{(v_a \cdot v_k)^2 + (v_a \cdot u_k)^2}{|v_a|^2 |v_k|^2} \quad (24)$$

Because $v_a^2$ remains the same when comparing the correlations of an unknown vector $v_a$ with the various model vectors $v_k$, it is sufficient to calculate and compare the values given by $$C = \frac{(v_a \cdot v_k)^2 + (v_a \cdot u_k)^2}{|v_k|^2} \quad (25)$$

for each model vector $v_k$. Equation 25 is the same as Equation 5.

TABLE I

Correlations of Unknowns with Models

| Unknown Entered | | Highest | Next Highest | Lowest |
|---|---|---|---|---|
| 1-stroke | W | W-27704 | 9-15648 | M-130 |
| | 6 | 6-14736 | U-11104 | D-630 |
| 2-stroke | A | A-14147 | J-5530 | E-1074 |
| | X | X-12776 | J-7882 | F-114 |
| 3-stroke | I | I-16229 | — | H-2304 |
| | H | H-9053 | — | I-1067 |

TABLE II

Resolution of Rotations

| Example No. | Unknown Entered | Model | Correlation C | Rotation R |
|---|---|---|---|---|
| 1 | N | N | 541039 | 0.999← |
| | | Z | 519727 | −0.032 |
| | | | 486935* | |
| | | L | 309023 | — |
| 2 | N | Z | 420487 | −0.041 |
| | | N | 398515 | 0.999← |
| | | | 378438* | — |
| | | 2 | 232954 | — |
| 3 | Z | N | 265347 | 0.036 |
| | | Z | 250969 | 0.991← |
| | | | 239983* | — |
| | | L | 221695 | — |

*Threshold value

What is claimed is:

1. A machine method of recognizing an unknown symbol as one of a set of stored model symbols wherein said unknown symbol and said model symbols are each represented as an ordered set of coordinate samples, which comprises:

translating the samples for said unknown symbol and each model symbol so that the centroids of said unknown symbol and said model symbol lie at a common origin, comparing said unknown symbol with each model symbol in turn by equalizing the number of translated samples for said unknown symbol and said model symbol and determining the correlation of said unknown symbol with said model symbol from the equalized number of said translated samples for said unknown symbol and the equalized number of said translated samples for said model symbol by calculating said correlation as a quantity indicating the closeness of a representation of all possible rotations and sizes of said unknown symbol to a representation of all possible rotations and sizes of said model symbol and recognizing said unknown symbol as the model symbol associated with the highest correlation, whereby said recognition is independent of the size, position or orientation of said unknown symbol with respect to said model symbols.

2. The method of claim 1 wherein said calculating step further comprises:

calculating said correlation as:

$$C = \frac{(v_a \cdot v_k)^2 + (v_a \cdot u_k)^2}{|v_k|^2}$$

where vector $v_a$ is the equalized ordered set of translated samples for said unknown symbol, vector $v_k$ is the equalized ordered set of translated samples for said model symbol, vector $u_k$ is derived from vector $v_k$ by a counterclockwise rotation of $\pi/2$ radians and said symbol associated with the highest correlation is the model symbol associated with the highest value of C.

3. The method of claim 1 which further comprises:

storing said ordered sets of coordinate samples for said model symbols while said model symbols are being handwritten on a digitizing tablet.

4. The method of claim 3 which further comprises:

storing the number of pen strokes used to write each model symbol and each unknown symbol and wherein said comparing step further comprises:

limiting said comparing step to those of said model symbols having the same number of pen strokes as the unknown symbol.

5. The method of claim 4 wherein said equalizing step further comprises equalizing said samples on a stroke-by-stroke basis.

6. The method of claim 5 wherein said equalizing step further comprises:

limiting vector $v_a$ to a subset of essentially uniformly spaced samples from said ordered set for said unknown symbol, and limiting vector $v_k$ to include the same number of essentially uniformly spaced samples, stroke-by-stroke, from said ordered set for said model symbol as in said limited vector $v_a$.

7. The method of claim 5 wherein said equalizing step further comprises:

augmenting the number of samples in said vector $v_k$ by interpolating a fixed number of additional samples between each adjacent pair of actual samples in said vector $v_k$, and limiting vector $v_k$ to include the same number of essentially uniformly spaced samples, stroke-by-stroke, from said augmented vector $v_k$ as in said vector $v_a$.

8. The method of claim 1 which further comprises:
if an unknown symbol is recognized incorrectly, adapting said set of model symbols by adding said ordered sequence of samples for said incorrectly recognized symbol to said set of model symbols as an additional representative example of the correct symbol to be associated with said incorrectly recognized symbol.

9. The method of claim 1 which further comprises:
continually adapting said set of model symbols by storing said ordered sequences of samples for each of a specified number of the most recently entered instances of each model symbol.

10. The method of claim 2 which comprises the additional step of:
establishing a threshold value related to said highest value of C,
if the value of C for more than one model symbol exceeds said threshold value then, for each model having a value of C above said threshold value, calculating the rotation of said model symbol with respect to said unknown symbol and
wherein said recognizing step comprises recognizing said unknown symbol as the model symbol having the smallest rotation.

11. The model of claim 10 wherein said rotation calculating step further comprises:
calculating said rotation as:

$$R = \frac{v_a \cdot v_k}{\sqrt{(v_a \cdot v_k)^2 + (v_a \cdot u_k)^2}}$$

wherein said model symbol having the smallest rotation is the symbol having R closest to unity.

12. The method of claim 11 wherein said establishing step further comprises establishing said threshold value as a fixed percentage of said highest value of C.

13. The method of claim 3 for use in verifying signatures wherein said model symbols are previously written signatures and said unknown symbol is a signature to be verified.

14. The method of claim 13 comprising the additional step of:
comparing said highest value of C with the next-highest value of C and rejecting said signature to be verified if said next-highest value exceeds a certain percentage of said highest value.

15. The method of claim 13 comprising the additional step of:
comparing said highest value of C with a threshold value and rejecting said signature to be verified if said highest value does not exceed said threshold value.

16. The method of claim 1 which further comprises:
storing sets of pre-recorded coordinate samples for a plurality of versions of said model symbols in said set of stored model symbols.

17. The method of claim 16 which further comprises:
as unknown symbols are recognized, replacing at least one set of pre-recorded samples for a model symbol with at least one set of samples for an unknown symbol recognized as said model symbol.

18. The method of claim 17 wherein said replacing step further comprises:
replacing said sets of pre-recorded samples for a model symbol with a smaller number of sets of samples for unknown symbols recognized as said model symbol.

19. The method of claim 16 which further comprises:
as unknown symbols are recognized, augmenting said sets of pre-recorded samples for a model symbol with at least one set of samples for an unknown symbol recognized as said model symbol.

20. A machine method of finding the closest match for an unknown symbol in a set of stored model symbols wherein said unknown symbol and said model symbols are each represented as an ordered set of coordinate samples with the centroids of said unknown symbol and said model symbols at a common origin, said samples for said unknown symbol are compared in turn with said samples for each of said model symbols, before each comparison, the number of translated samples for said unknown symbol is equalized with the number of said samples for said model symbol and during each comparison, the correlation of said unknown symbol with said model symbol is calculated from said equalized and translated samples and the model symbol associated with the highest correlation is identified as the closest match CHARACTERIZED IN THAT
said correlation calculation step further comprises:
calculating said correlation as a quantity indicating the closeness of a representation of all possible rotations and sizes of said unknown symbol to a representation of all possible rotations and sizes of said model symbol,
whereby said comparisons are independent of the size, position or orientation of said unknown symbol with respect to said model symbols.

21. The method of claim 20 FURTHER CHARACTERIZED IN THAT
said calculating step further comprises calculating said correlation as:

$$C = \frac{(v_a \cdot v_k)^2 + (v_a \cdot u_k)^2}{|v_k|^2}$$

where vector $v_a$ is the equalized ordered set of translated samples for said unknown symbol, vector $v_k$ is the equalized ordered set of translated samples for said model symbol, vector $u_k$ is derived from vector $v_k$ by a counterclockwise rotation of $\pi/2$ radians and
said symbol associated with the highest correlation is the symbol associated with the highest value of C.

22. The method of claim 20 FURTHER CHARACTERIZED IN THAT
said method further comprises:
storing said ordered sets of coordinate samples for said model symbols while said model symbols are being handwritten on a digitizing tablet.

23. The method of claim 22 FURTHER CHARACTERIZED IN THAT
said method further comprises:
storing the number of pen strokes used to write each model symbol and each unknown symbol and wherein said comparing step further comprises:
limiting said comparing step to those of said model symbols having the same number of pen strokes as the unknown symbol.

24. The method of claim 23 FURTHER CHARACTERIZED IN THAT
said equalizing step further comprises equalizing said samples on a stroke-by-stroke basis.

25. The method of claim 24 FURTHER CHARACTERIZED IN THAT
said equalizing step further comprises:
limiting vector $v_a$ to a subset of essentially uniformly spaced samples from said ordered set for said unknown symbol, and
limiting vector $v_k$ to include the same number of essentially uniformly spaced samples, stroke-by-stroke, from said ordered set for said model symbol as in said limited vector $v_a$.

26. The method of claim 20 FURTHER CHARACTERIZED IN THAT
if an unknown symbol is recognized incorrectly, adapting said set of model symbols by adding said ordered sequence of samples for said incorrectly recognized symbol to said set of model symbols as an additional representative example of the correct symbol to be associated with said incorrectly recognized symbol.

27. The method of claim 20 FURTHER CHARACTERIZED IN THAT
said method further comprises
continually adapting said set of model symbols by storing said ordered sequences of samples for each of a specified number of the most recently entered instances of each model symbol.

28. The method of claim 21 FURTHER CHARACTERIZED IN THAT
said method further comprises:
establishing a threshold value related to said highest value of C,
if the value of C for more than one model symbol exceed said threshold value then, for each model symbol having a value of C above said threshold value, calculating the rotation of said model symbol with respect to said unknown symbol and
wherein said recognizing step comprises recognizing said unknown symbol as the model symbol having the smallest rotation.

29. The model of claim 28 FURTHER CHARACTERIZED IN THAT
said rotation calculating step further comprises:
calculating said rotation as:

$$R = \frac{v_a \cdot v_k}{\sqrt{(v_a \cdot v_k)^2 + (v_a \cdot u_k)^2}}$$

wherein said model symbol having the smallest rotation is the symbol having R closest to unity.

30. The method of claim 29 FURTHER CHARACTERIZED IN THAT
said establishing step further comprises establishing said threshold value as a fixed percentage of said highest value of C.

31. The method of claim 22 FURTHER CHARACTERIZED IN THAT
said method is used for verifying signatures, said stored model symbols are previously written signatures and said unknown symbol is a signature to be verified.

32. The method of claim 31 FURTHER CHARACTERIZED IN THAT
said method further comprises:
comparing said highest value of C with the next-highest value of C and rejecting said signature to be verified if said next-highest value exceeds a certain percentage of said highest value.

33. The method of claim 20 FURTHER CHARACTERIZED IN THAT
said method further comprises:
storing sets of pre-recorded coordinate samples for a plurality of versions of each said model symbol in said set of stored model symbols.

34. The method of claim 33 FURTHER CHARACTERIZED IN THAT
said method further comprises:
as unknown symbols are recognized, replacing at least part of said pre-recorded samples for each said model symbol with at least one set of samples for an unknown symbol recognized as said model symbol.

35. The method of claim 34 FURTHER CHARACTERIZED IN THAT
said replacing step further comprises:
replacing said sets of pre-recorded samples for each said model symbol with a smaller number of sets of samples for unknown symbols recognized as said model symbol.

36. The method of claim 33 FURTHER CHARACTERIZED IN THAT
said method further comprises
as unknown symbols are recognized, augmenting said sets of pre-recorded samples for each said model symbol with at least one set of samples for an unknown symbol recognized as said model symbol.

* * * * *